Patented Dec. 30, 1941

2,268,350

UNITED STATES PATENT OFFICE 2,268,350

METHOD OF PREPARING LUMINESCENT MAGNESIUM TUNGSTATE

Frank E. Swindells, Towanda, Pa., assignor to The Patterson Screen Company, Towanda, Pa., a corporation of Pennsylvania No Drawing. Application March 26, 1941, Serial No. 385,378

15 Claims. (Cl. 250—81)

This invention relates to a method of preparing magnesium tungstate, and particularly luminescent magnesium tungstate which is especially adapted for luminescent screens.

In general, the present invention is a discovery of a method by which luminescent magnesium tungstate may be economically formed, in a relatively simple procedure, from solutions of soluble magnesium salt and soluble tungstate. It has been found that magnesium tungstate cannot be satisfactorily manufactured by merely mixing solutions of a soluble magnesium salt and a soluble tungstate. If the solutions are too dilute and remain at room or normal temperatures after mixing, it is difficult to precipitate out the magnesium tungstate. When highly concentrated solutions are used and precipitation is attempted at room or normal temperatures, the magnesium tungstate separates as a gummy, gelatinous mass which is difficult to filter and from which it is difficult to wash the soluble salts formed in the reaction and occurring as impurities. These impurities, present in the form of salts, hinder the full development of the luminescent power of the magnesium tungstate when it is calcined, and also promote the growth of undesired large crystals.

According to the present invention, a solution is formed from a soluble magnesium salt, a soluble tungstate, and solvent and is heated to precipitate magnesium tungstate. The magnesium salt and the soluble tungstate should be provided in sufficient amounts to secure precipitation of the magnesium tungstate when the mixed solution is heated. The magnesium salt and the soluble tungstate should also be provided in such quantities as to avoid substantial precipitation before the mixed solution is heated. A small amount of precipitate before heating may be advantageous, as it tends to collect the traces of impurities which separate out and facilitates their removal by filtration. A large part of the magnesium tungstate in this precipitate, which is formed before the heating step, can be extracted with water and added to succeeding batches.

When the mixed solution of a soluble magnesium salt and a soluble tungstate is heated, magnesium tungstate crystallizes out as a dense granular mass which is easily washed and separated from the mother liquor. The dense mass may be readily dried and calcined to form crystals of excellent luminescent power.

In a preferred method embodying this invention, solutions of a soluble magnesium salt and a soluble tungstate may be combined cold and then heated, or may be heated both before and after mixing. The method may also be practiced by dissolving the magnesium salt and the tungstate in the same body of solvent, instead of forming two separate solutions and then mixing the two solutions. In large scale operations, better results are obtained if the magnesium salt and the soluble tungstate are dissolved separately and the two solutions are then mixed.

It is, therefore, an object of this invention to provide an economical method of preparing a magnesium tungstate material possessing excellent luminescent properties.

Another object is to provide an improved method of preparing luminescent screen material, particularly normal magnesium tungstate (MgWO$_4$).

A further object of the invention is to provide a satisfactory method of preparing magnesium tungstate from a soluble magnesium salt and a soluble tungstate.

Another object of this invention is to provide a method of preparing magnesium tungstate which is suitable for blending with other materials utilized in the production of luminescent screen materials.

Other objects and advantages of this invention will be apparent from the following description.

First example

In one preferred example of the practice of this novel method, 200 grams of hydrated magnesium chloride (MgCl$_2$.6H$_2$O) are dissolved in 900 cubic centimeters of cold water, and 330 grams of hydrated sodium tungstate (Na$_2$WO$_4$.2H$_2$O)

are dissolved in 500 cubic centimeters of cold water. The magnesium chloride solution is then added to the sodium tungstate solution. The addition should be made slowly and preferably with vigorous stirring to prevent the formation of a permanent precipitate. The mixed solutions contain about 14.5 grams of the dissolved hydrated magnesium chloride and about 23.6 grams of dissolved hydrated sodium tungstate to each 100 cubic centimeters of water. The mixed solutions are heated by suitable means to a temperature of about 95° to 100° centigrade, which temperature is maintained for approximately one hour. The mixture preferably is continuously stirred, for example, with a mechanical stirrer, while it is heated. During the heating, crystals of magnesium tungstate, in either a hydrated or anhydrous form, separate out as a dense granular mass.

Second example

The magnesium tungstate in crystalline form may also be obtained by the following procedure: 260 grams of hydrated magnesium nitrate (Mg(NO$_3$)$_2$.6H$_2$O) are dissolved in 750 cubic  centimeters of water at normal temperature.

This prepared solution is added to a solution of 330 grams of hydrated sodium tungstate $$(Na_2WO_4.2H_2O)$$

in 500 cubic centimeters of water at normal temperature. The solutions should be mixed slowly and preferably with vigorous stirring to prevent the formation of a permanent precipitate. The mixed solutions are then heated, and preferably also stirred as explained above in the first method, to obtain a dense granular mass of magnesium tungstate crystals as a precipitate.

Third example

As a further example, the solutions, from which the magnesium tungstate crystals are obtained, may be produced as follows: 200 grams of hydrated magnesium chloride ($MgCl_2.6H_2O$) are dissolved in 1200 cubic centimeters of water. A second solution is formed by dissolving 330 grams of anhydrous potassium tungstate ($K_2WO_4$) in 800 cubic centimeters of water. The two solutions are then mixed and heated and preferably also stirred as explained above in connection with the first example of this invention in which solutions of magnesium chloride and sodium tungstate are used. A dense granular mass of magnesium tungstate crystals is obtained as a precipitate.

Fourth example

Magnesium tungstate crystals may also be obtained according to the following procedure: 200 grams of hydrated magnesium chloride ($MgCl_2.6H_2O$) are dissolved in 750 cubic centimeters of water. A second solution is prepared by dissolving 330 grams of hydrated sodium tungstate ($Na_2WO_4.2H_2O$) in 550 cubic centimeters of water. The two solutions are separately heated to their boiling points and while boiling are mixed and preferably also agitated. The mixed solutions are further heated and preferably also agitated until precipitation of the crystals of magnesium tungstate as a dense granular mass is completed.

In the four examples given above for preparing the mixed solutions, from which the magnesium tungstate crystals are precipitated, the quantities of the soluble magnesium salt and the soluble tungstate may be varied as indicated in the following table which shows concentration ranges expressed in grams of the reactants per 100 cubic centimeters of water in the mixed solutions.

|  | Approximate minimum concentration at which precipitation takes place on heating | Approximate minimum concentration at which precipitate separates without heating |
|---|---|---|
| Example 1: | | |
| $MgCl_2.6H_2O$ | 7 | 14.6 |
| $Na_2WO_4.2H_2O$ | 11.5 | 23.6 |
| Example 2: | | |
| $Mg(NO_3)_2.6H_2O$ | 10 | 20.8 |
| $Na_2WO_4.2H_2O$ | 13 | 26.4 |
| Example 3: | | |
| $MgCl_2.6H_2O$ | 7 | 10 |
| $K_2WO_4$ | 11.5 | 16.5 |
| Example 4: | | |
| $MgCl_2.6H_2O$ | 7 | 60 |
| $Na_2WO_4.2H_2O$ | 11.5 | 98 |

In Example 4, the solutions are mixed after heating separately. Hence the upper limit of concentration which may be used theoretically is fixed by the solubility of the sodium chloride formed in the reaction. When the concentrations are approximately as given in the second column of the above table, a slight precipitate may occur before the heating step but may be advantageous as explained above.

The crystals of magnesium tungstate obtained in the procedures described above are then treated in the following manner: The crystals are washed several times by decantation with boiling water, collected on a filter, and the washing with boiling water continued until the washings are nearly free from chlorides (Examples 1, 3 and 4) or nitrates (Example 2). The crystals may then be sucked as dry as possible, dried at 100° to 125° centigrade and pulverized. This pulverized material is calcined at approximately 1,000° centigrade for a period of about one to two hours. After cooling, the mass is treated with water to remove any traces of soluble salts, dried and finally screened. The resulting product is a crystalline powder showing an intense blue-white luminescence when subjected to ultraviolet light of 2,537 Angstrom units.

The mother liquors and washings may be treated by known methods for the recovery of any tungsten remaining in the solution, or they may be used in the preparation of successive batches of magnesium tungstate.

While the above examples are the preferred methods of obtaining the advantages of my invention, it is also possible to obtain satisfactory results by using soluble magnesium salts other than hydrated magnesium chloride or hydrated magnesium nitrate, and by using other soluble tungstates of the alkali metals in place of hydrated sodium tungstate and anhydrous potassium tungstate. According to my work in connection with this invention, the minimum temperature required to produce crystallization of the magnesium tungstate from the solutions is on the order of about 60° centigrade.

The magnesium tungstate prepared by the methods set forth herein may be readily blended with other known compounds for the preparation of a luminescent material having desired properties and suitable for luminescent screens.

I claim:

1. In a method of preparing magnesium tungstate for use as a luminescent material, the steps of forming a solution of hydrated magnesium chloride in water, forming a solution of hydrated sodium tungstate in water, mixing the two solutions, said mixed solutions containing on the order of 7 to 14.6 grams of dissolved hydrated magnesium chloride to each 100 c. c. of water and on the order of 11.5 to 23.6 grams of dissolved hydrated sodium tungstate to each 100 c. c. of water, and then heating the mixed solutions to maintain the same at a temperature above about 60° C. to crystallize out magnesium tungstate as a granular mass.

2. In a method of preparing magnesium tungstate for use as a luminescent material, the steps of forming a solution of hydrated magnesium chloride in water in the proportion of about 22.2 grams of the chloride to each 100 c. c. of water, forming a second solution of hydrated sodium tungstate in water in the proportion of about 66 grams of the tungstate to each 100 c. c. of water, mixing the two solutions to provide a concentration of about 14.5 grams of the dissolved hydrated magnesium chloride and about 23.6 grams of dissolved hydrated sodium tungstate to each 100 c. c. of the solvent in the mixed solutions, and heating the mixed solutions to a temperature above about 60° C. to crystallize out magnesium tungstate as a granular mass.

3. In a method of preparing magnesium tungstate for use as a luminescent material, the steps of forming a solution of hydrated magnesium nitrate in water, forming a solution of hydrated sodium tungstate in water, mixing the two solutions, said mixed solutions containing on the order of 10 to 20.8 grams of dissolved hydrated magnesium nitrate to each 100 c. c. of water and on the order of 13 to 26.4 grams of dissolved hydrated sodium tungstate to each 100 c. c. of water, and then heating the mixed solutions to maintain the same at a temperature above about 60° C. to crystallize out magnesium tungstate as a granular mass.

4. In a method of preparing magnesium tungstate for use as a luminescent material, the steps of forming a solution of hydrated magnesium nitrate in water in the proportion of about 34.7 grams of the hydrated magnesium nitrate to each 100 c. c. of water, forming a second solution of hydrated sodium tungstate in water in the proportion of about 66 grams of the hydrated sodium tungstate to each 100 c. c. of water, mixing the two solutions to provide a concentration of about 20.8 grams of the dissolved hydrated magnesium nitrate and about 26.4 grams of dissolved sodium tungstate to each 100 c. c. of the solvent in the mixed solutions, and heating the mixed solutions to a temperature above about 60° C. to crystallize out magnesium tungstate as a granular mass.

5. In a method of preparing magnesium tungstate for use as a luminescent material, the steps of forming a solution of hydrated magnesium chloride in water, forming a solution of anhydrous potassium tungstate in water, mixing the two solutions, said mixed solutions containing on the order of 7 to 10 grams of dissolved magnesium chloride to each 100 c. c. of water and on the order of 11.5 to 16.5 grams of dissolved anhydrous potassium tungstate to each 100 c. c. of water, and then heating the mixed solutions to maintain the same at a temperature above about 60° C. to crystallize out magnesium tungstate as a granular mass.

6. In a method of preparing magnesium tungstate for use as a luminescent material, the steps of forming a solution of hydrated magnesium chloride in water in the proportion of about 16.6 grams of the hydrated magnesium chloride to each 100 c. c. of water, forming a second solution of an anhydrous potassium tungstate in water in the proportion of about 41.2 grams of the anhydrous potassium tungstate to each 100 c. c. of water, mixing the two solutions to provide a concentration of about 10 grams of the dissolved hydrated magnesium chloride and about 16.5 grams of dissolved anhydrous potassium tungstate to each 100 c. c. of the solvent in the mixed solutions, and heating the mixed solutions to a temperature above about 60° C. to crystallize out magnesium tungstate as a granular mass.

7. In a method of preparing magnesium tungstate for use as a luminescent material, the steps of forming a solution of hydrated magnesium chloride in water, forming a solution of hydrated sodium tungstate in water, heating the two solutions separately, mixing the heated solutions, said mixed solutions containing on the order of 7 to 60 grams of dissolved hydrated magnesium chloride to each 100 c. c. of water, and on the order of 11.5 to 98 grams of dissolved hydrated sodium tungstate to each 100 c. c. of water, and then heating the mixed solutions to maintain the same at a temperature above about 60° C. to crystallize out magnesium tungstate as a granular mass.

8. In a method of preparing magnesium tungstate for use as a luminescent material, the steps of forming a solution of a soluble magnesium salt in water, forming a second solution of a soluble tungstate of an alkali metal in water, heating the solutions separately to their boiling points, mixing the heated solutions, and maintaining the mixed solutions at a temperature above about 60° C. to crystallize out magnesium tungstate as a granular mass.

9. The method of preparing a luminescent magnesium tungstate comprising the steps of dissolving a soluble magnesium salt in cold water, dissolving a soluble tungstate of an alkali metal in cold water, adding one of the solutions to the other solution slowly while stirring, heating the mixed solutions to a temperature above 60° C. to crystallize out magnesium tungstate as a granular mass, separating said mass from the mother liquor, washing said mass with boiling water, and drying and calcining the mass to obtain crystals of luminescent magnesium tungstate.

10. The method of preparing a luminescent magnesium tungstate comprising the steps of dissolving a soluble magnesium salt in cold water, dissolving a soluble tungstate of an alkali metal in cold water, slowly adding one solution to the other solution while vigorously stirring the mixture, heating the mixed solutions to a temperature on the order of 95° C. to 100° C. and maintaining said temperature for approximately one hour while stirring the mixture to precipitate and crystallize out magnesium tungstate as a dense granular mass, washing the resulting crystals of magnesium tungstate by decantation with boiling water, collecting the crystals and further washing the crystals with boiling water until they are nearly free from soluble impurities, drying the crystals at a temperature on the order of 100° to 125° C., pulverizing the crystals and calcining the product at about 1000° C., extracting the mass with water to remove traces of soluble salts, and drying and screening the mass to obtain a crystalline powder.

11. In a method of preparing magnesium tungstate for use as a luminescent material, the steps comprising: forming a solution of magnesium chloride and sodium tungstate in water, and heating the solution to maintain the same at a temperature above about 60° C. to precipitate and crystallize out magnesium tungstate as a granular mass, said magnesium chloride and said sodium tungstate being dissolved in said solution in such quantity as to provide substantial precipitation of the magnesium tungstate after, and only after, said solution is heated.

12. In a method of preparing magnesium tungstate for use as a luminescent material, the steps of forming a solution of magnesium chloride in water, forming a solution of sodium tungstate in water, mixing the two solutions, and heating the mixed solutions to maintain the same at a temperature above about 60° C. to crystalize out magnesium tungstate as a granular mass.

13. In a method of preparing magnesium tungstate for use as a luminescent material, the steps of forming a solution of a soluble tungstate of an alkali metal and a soluble magnesium salt in water, heating said solution to a temperature above about 60° C., and continuing said heating to precipitate and crystallize out magnesium tungstate as a granular mass.

14. In a method of preparing magnesium tungstate for use as a luminescent material, the steps of forming a solution of a soluble tungstate of an alkali metal and a soluble magnesium salt in water, heating said solution to a temperature within a range on the order of 60° C. to 100° C., and continuing said heating while agitating the solution to precipitate and crystallize out magnesium tungstate as a granular mass, said soluble tungstate and said magnesium salt being dissolved in said solution in such quantity as to provide for substantial precipitation after, and only after, said heating of the solution.

15. In a method of preparing magnesium tungstate for use as a luminescent material, the steps of dissolving a soluble magnesium salt in water, dissolving a soluble tungstate of an alkali metal in water, mixing the magnesium salt solution and the tungstate solution, heating the mixed solutions to a temperature within a range on the order of 60° C. to 100° C. while agitating the mixed solution, and continuing said heating and agitating to precipitate and crystallize out magnesium tungstate as a dense granular mass.

FRANK E. SWINDELLS.